S. P. ALONSO.
ANGLE MEASURING APPARATUS.
APPLICATION FILED JULY 9, 1920.
1,420,175.
Patented June 20, 1922.
3 SHEETS—SHEET 1.
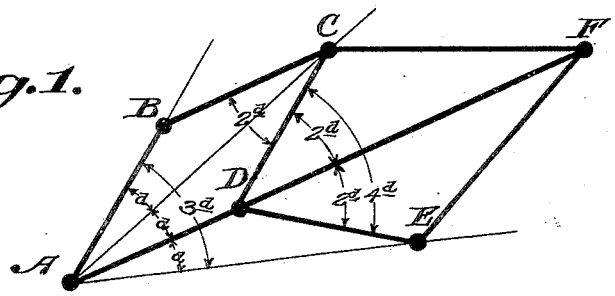
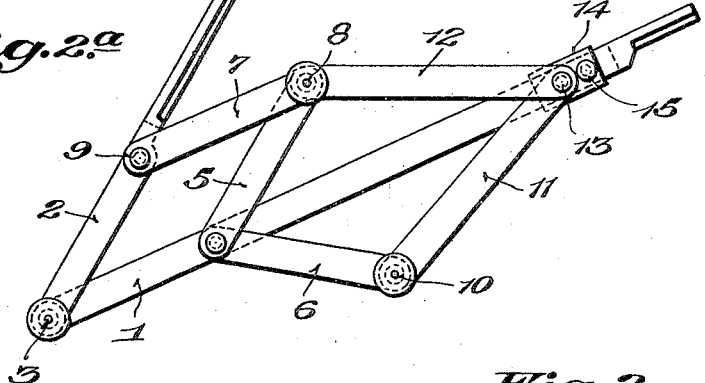
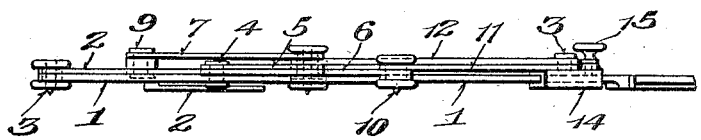
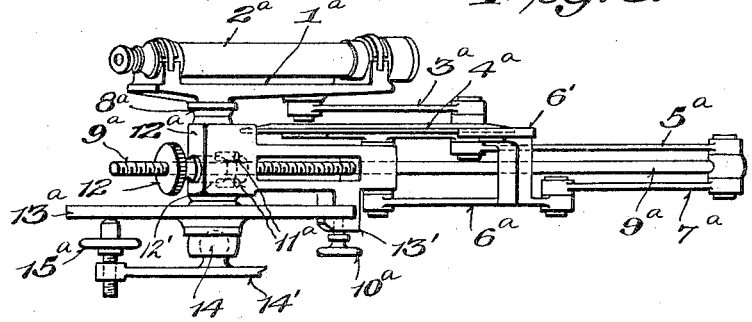
Inventor
Segundo Perez Alonso,
By B. Singer,
Attorney

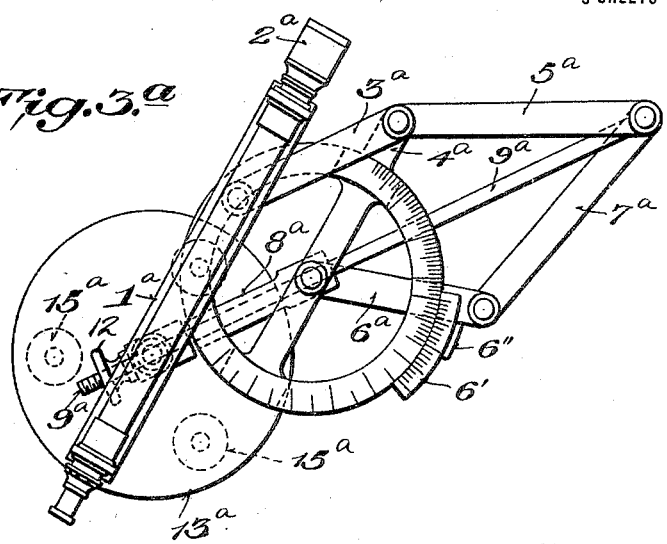
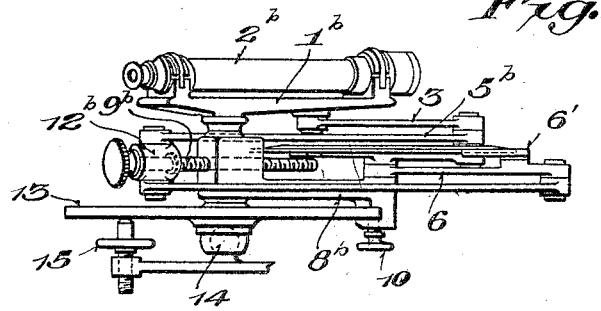
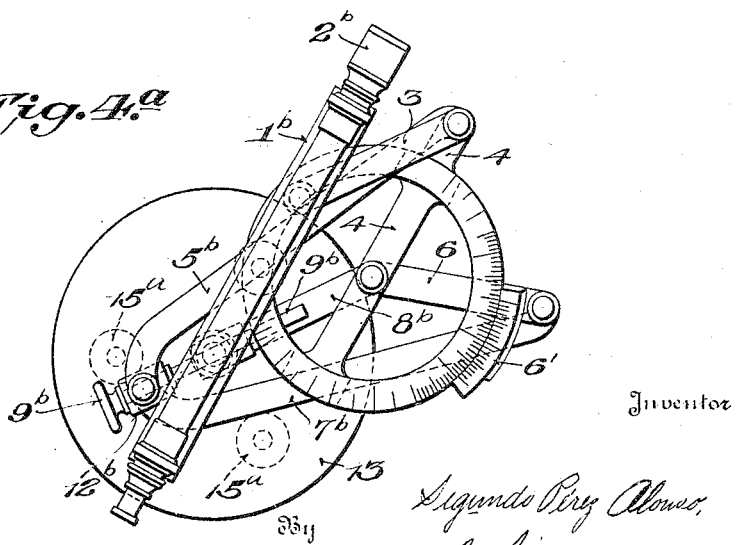

S. P. ALONSO.
ANGLE MEASURING APPARATUS.
APPLICATION FILED JULY 9, 1920.
1,420,175.
Patented June 20, 1922.
3 SHEETS—SHEET 3.
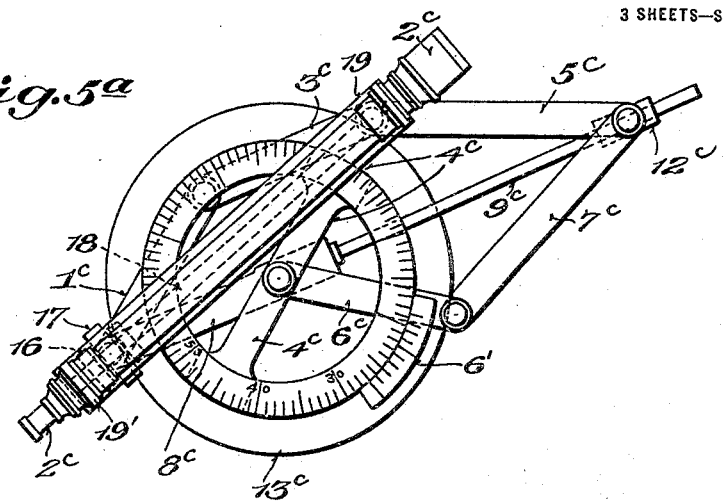
Fig. 5ᵃ
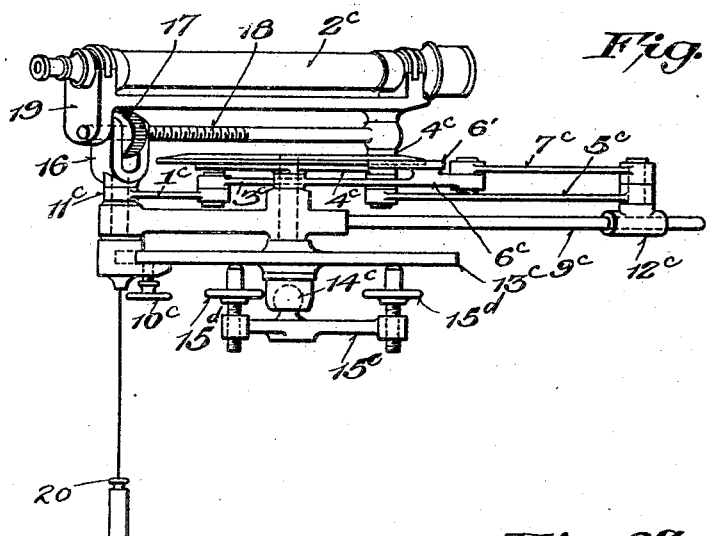
Fig. 5.
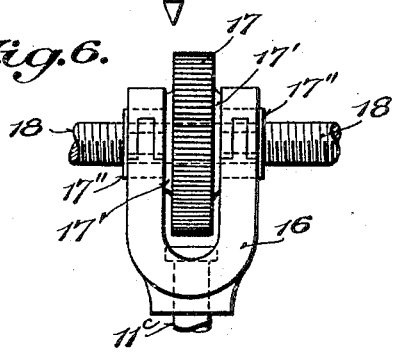
Fig. 6.
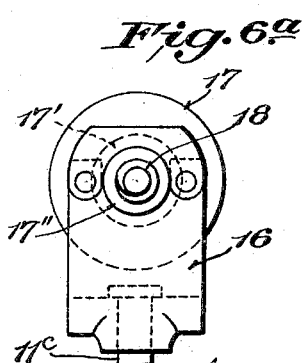
Fig. 6ᵃ
Inventor
Segundo Perez Alonso,
By B. Singer, Attorney

UNITED STATES PATENT OFFICE.

SEGUNDO PEREZ ALONSO, OF HABANA, CUBA.

ANGLE-MEASURING APPARATUS.

1,420,175. Specification of Letters Patent. Patented June 20, 1922.

Application filed July 9, 1920. Serial No. 395,065.

*To all whom it may concern:*

Be it known that I, SEGUNDO PEREZ ALONSO, a subject of the King of Spain, residing at Habana, Cuba, have invented a new and useful Angle-Measuring Apparatus, of which the following is a specification.

This invention relates to apparatus designed for measuring angles and its object is to provide an apparatus of such class and of improved construction wherein is obtained the duplication, triplication and quadruplication of angles as well as the reverse solution of such problems, that is, the reduction of such angles to half, third or fourth part, etc.

In general terms this invention consists in adapting an accessory to the goniometers of all classes, sextants, transits, teodolites, telescopes, etc., as well as to compasses, pantographs and other similar apparatus used in topography, geodesia and drawing, as well as to the various machines and tools where its use might be required, this attachment being based upon a very simple application of elementary geometrical principles which will be more fully understood in the course of this specification.

The invention is described with reference to the figures of the annexed drawings, in which:

Fig. 1 is a plan diagrammatic view showing the principle on which this invention is based.

Fig. 2 is a side elevation of a trisector compass constructed in accordance with this invention.

Fig. 2ª is an upper plan view thereof.

Fig. 3 is a side elevation of an angle duplicator pantograph goniometer constructed in accordance with the principle of this invention.

Fig. 3ª is an upper plan view thereof.

Fig. 4 is a side elevation of a modified form of said goniometer constructed in accordance with the said principle.

Fig. 4ª is an upper plan view thereof.

Fig. 5 is a side elevation of a pantograph goniometer for quadruplicating angles, which is constructed in accordance with this invention.

Fig. 5ª is an upper plan view thereof.

Figs. 6 and 6ª are enlarged front and side elevations of a construction detail.

Referring now to Fig. 1 of these drawings, same represents graphically the principle on which my invention is based, which consists of a small parallelogram A B C D of even sides which are supposed to be articulated on the vertex and its side A D is extended forming the diagonal of a quadrilateral C F E D constructed on side D C of parallelogram A B C D and whose sides are also articulated on its vertex, this quadrilateral complying with the requirement that its sides E F and D E be respectively alike to the sides C F and C D. Simple geometrical considerations will lead us to the conclusion that the angles B A C, C A D and D A E are equal to one another and that the angles C D F and F D E are equal to each other and that each one of these angles C D F and F D E is double the angle B A C, that angle C D E is quadruple the angle B A C and that angle B A E is triple the angle B A C.

The sides of parallelogram A B C D and quadrilateral C F E D being articulated on its vertex so that the point F may slide along the line A F, the previously enunciated conditions will be complied with for any position whatsoever of point F and the mentioned angles will be kept always in the proportion mentioned.

In Figs. 2 and 2ª is illustrated a trisector compass constructed in accordance with the principle previously set forth, this compass consisting of two rules 1 and 2 articulated on one of its ends as indicated in 3. Rule 1 has articulated at a point 4 along the same two other rules 5 and 6 of which the rule 5 has articulated on its free end 8 another rule 7 which articulates in 9 with the middle portion of rule 2 and on the mentioned end 8 articulates also with a second rule 12 which in turn is articulated in 13 to a slider 14 on rule 1 and provided with a set screw 15 and there being articulated in said point 13 another rule 11 which is articulated on its free end in 10 to the rule 6 articulated in 4 as set forth, to rule 1. Of the previously mentioned elements, the rules 5, 6 and 7 are of the same length and the distance from articulation 3 to articulation 4 is just the same as that between articulation 3 to articulation 9. Rules 11 and 12 are exactly alike and the free ends of rules 1 and 2 present a cut off portion whose border is on the extension of the shaft of the articulations and in perfect alinement therewith. On the articulations 3, 8 and 10 can be placed a fine point or a bore where a puncher, pen point or fine point can be inserted.

As it can be readily understood, this apparatus is nothing but the actual application of the principle previously set forth and upon a slight comparison between Figures 1 and 2 this will clearly be disclosed. Thus, whenever it is desired to divide a given angle or arch in three equal parts the apparatus is placed with the point 3 on the vertex of the given angle and the rule 2 in such a manner that the beveled border may register or correspond with one of the end radius or sides of the angle. Then the slider 14, which in this instance represents the point F of Fig. 1, is slid on the rule 1 which represents the line A F until the point 10 may correspond with the other side of the given angle, and then pressing the set screw 15. Then is marked a point of the beveled border of rule 1 and another point with the puncher arranged on the articulation 8 and then uniting the center 3 to these marks we shall have in these lines the trisector radius of the given angle.

In Figs. 3 and $3^a$ is represented an angle duplicator pantograph goniometer constructed in accordance with this invention, $1^a$ indicating the support of a spy-glass alidade $2^a$, the support $1^a$ being rotatably mounted on the end block of arm $8^a$ provided with an opening for inserting therethrough in the same direction the rod $9^a$ which is threaded in this part and smooth on the remaining part and being threadedly mounted on a horizontal cylinder $12'$ mounted substantially inside the block 12 and held by two transverse pins $11^a$, these two pins being lodged in a circular groove or collar of said cylinder, the said arrangement of the pins with respect to the cylinder $12'$ permitting the turn of the rod but not the advance or retrocession thereof. The mentioned cylinder terminates out of block $12^a$ in a milled head $12''$. On the free end of rod $9^a$ are articulated the rods $5^a$ and $7^a$, the rod $7^a$ being articulated at its opposite end with another rod $6^a$ which is articulated with the approximately middle point of another rod $4^a$ constituting the diameter of a limb fixed thereto and divided in 180 degrees with whose outer border cooperates slidably a vernier $6'$ fixed to a bracket $6''$ united to the rod $6^a$. The rod $4^a$ projects beyond the limb and its end articulates with the rod $3^a$ which in turn is articulated to the support $1^a$ of the alidade and with rod $5^a$. Block 12 is rotatably mounted on center of the circular platform $13^a$ whose border fits slidably in a recess formed in a bracket $13'$ projecting from arm $8^a$ and which is provided with a screw $10^a$ for the adjustment of this arm $8^a$. Platform 13 is mounted on a nut articulation 14 connected to a supporting base $14'$ which can be leveled by the set screws $15^a$.

A slight examination of the construction of this apparatus will show that the same bases on the same principle as set forth with reference to the Fig. 1. For using the described apparatus same should be set in place in a point which should be the vertex of the angle to be divided; and with which the articulation 14 is brought to coincide; the supporting platform of the described apparatus is leveled or arranged horizontally or vertically whether the angles to be treated be azimuthal or zenithal by placing the vernier on the zero of the limb or in any point whatsoever previously determined, then the apparatus is turned around the center of platform $13^a$ until a sight placed on a side of the angle becomes within the optical field of the spy-glass $2^a$, then the set screw $10^a$ is tightened and actuating on the milled head 12 the spy-glass is directed toward the other sight which is supposed to be arranged on the other side of the angle, reading the angle directly on the limb or else obtaining the difference of readings on the limb on the two sights respectively, as the vernier had been placed on the zero or in other different points.

In Figs 4 and $4^a$ of the drawings is represented a modified construction of the previously described goniometer, though such modified construction is also based on the same principles of this invention. In this apparatus the arms or articulated rods $5^b$ and $7^b$ are in opposite directions to that shown in Figs. 3 and $3^a$ so as to reduce the size of the apparatus. A screw $9^b$ threaded on arm $8^b$ has rotatably mounted on its end a horizontal cylinder $12^b$ to which the said arms $5^b$ and $7^b$ are articulated, in substitution of the rod $9^a$ and the cylinder $12'$ of the prior illustration. The rest of the construction, that is, the spy-glass $2^b$, its support $1^b$ and the rest of the articulated rods are exactly the same as the described goniometers and its corresponding parts are designated with the same numerals. Its operation is also exactly the same as that of the type of goniometer previously described.

In Figs. 5 and $5^a$ of the drawings is represented a pantograph goniometer which serves for quadruplicating angles. This apparatus, as it will be observed, is also constructed in accordance with the principles on which the invention is based and comprises an alidade of spy-glass $2^c$ provided with a support 19 mounted on the horizontal threaded rod 18 which has one end rotatably mounted on the pending bracket $19'$ and the other one articulated in the intersection vertex or arms $3^c$, $4^c$ and 5, this rod being threaded through cylinders $17'$ on which terminates laterally the milled nut 17 mounted between the arms of the vertical fork 16, said cylinders 17′ being rotatably mounted on bearings 17″ formed in said arms 16 and the shaft of the fork is rotatably mounted on a vertical shaft 11ᶜ and this shaft terminates in a widened end or block provided with a recess wherein slidably fits the border of a horizontal plate 13ᶜ, the position of this plate being fixed with respect to the groove by a set screw 10ᶜ. By means of the non-sliding nut 17 the rod 18 is moved forward or backwards in rectilineal direction. On shaft 11ᶜ as vertex is mounted the parallelogram formed by the articulated arms 1ᶜ, 3ᶜ, 4ᶜ and 8ᶜ, arm 4ᶜ bearing a limb divided in 90 even parts for the direct measurement of the angles in sexagisimal degrees. Rod 18 constitutes together with the spy-glass 2ᶜ the diagonal of the said parallelogram on account of being articulated thereon the rods 3ᶜ and 4ᶜ. In that same point is also articulated the arm 5ᶜ whose end terminates in a sleeve mounted on a vertical shaft which at one end has a horizontal tubular collar 12ᶜ slidable along a rod 9ᶜ which is an extension of arm 8ᶜ. On the end of the shaft which has the collar 12ᶜ is articulated the arm 7ᶜ on whose opposite end is articulated another arm 6ᶜ articulated on its other end to the middle portion of the rod 4ᶜ and the arm 6ᶜ bears the vernier 6′ which slides upon the beveled outer edge of the limb. 14ᶜ designates a nut articulation for plate 13ᶜ on a supporting base 15ᶜ, provided with levelling screws 15ᵈ of the apparatus and 20 indicates a plumb which can be attached to the apparatus on shaft 11ᶜ.

For using the previously described apparatus, once the same is placed in station on the vertex of the angle to be quadruplicated whose vertex is brought in coincidence with the vertical shaft 11ᶜ and the platform 13ᶜ being leveled by means of the screws 15ᵈ and the vernier 6′ placed on the zero of the limb or in any other point, whose reading will be recorded, the apparatus should be turned so that the visual be directed to a sight or buoy disposed on one of the sides of the angle and fixing the apparatus by means of screw 10ᶜ. Then the nut 17 is operated until alining the spy-glass with the other sight or buoys arranged on the other side of the angle and the reading obtained directly on the limb or the difference between the readings thereon will give us the value of the angle four times larger.

If it is so desired a goniometer can be constructed which would be capable of triplicating angles, it only being necessary for the purpose to dispose the platform 13ᶜ rotatable on shaft 11ᶜ and the limb fixed to arm 1ᶜ and articulating the rod 18 with the spy-glass and its support on the articulation of the arms 6ᶜ and 7ᶜ.

Having thus described my invention and the manner in which the same is carried out, what I desire to protect by Letters-Patent is all that which may fall within the scope of the appended claim.

What I claim is:—

In angle measuring apparatus, five links, four of which are pivoted to each other to form an equal sided parallelogram linkage, the fifth link being pivoted on the pivot of two adjacent links, one of said adjacent links having an extension, and means slidably and pivotally connected to said extension for maintaining the angle between said fifth link and the other adjacent link double the angle between the link having the extension and the link opposite said other adjacent link throughout all the adjustments of the apparatus.

In witness whereof I affix my signature.

SEGUNDO PEREZ ALONSO.